United States Patent [19]

Bechtel et al.

[11] Patent Number: 4,580,875

[45] Date of Patent: Apr. 8, 1986

[54] ELECTRONIC CONTROL SYSTEM FOR AUTOMATIC REARVIEW MIRRORS FOR AUTOMOTIVE VEHICLES

[75] Inventors: Jon H. Bechtel; Frederick T. Bauer, both of Holland, Mich.

[73] Assignee: Gentex Corporation, Zeeland, Mich.

[21] Appl. No.: 595,401

[22] Filed: Mar. 30, 1984

[51] Int. Cl.$^4$ .............................................. G02B 17/00
[52] U.S. Cl. ..................................... 350/278; 350/281
[58] Field of Search ....................... 350/278, 279, 281

[56] References Cited

U.S. PATENT DOCUMENTS 4,443,057 4/1984 Bauer et al. .................... 350/281

*Primary Examiner*—John K. Corbin
*Assistant Examiner*—Rebecca D. Gass
*Attorney, Agent, or Firm*—Malcolm R. McKinnon

[57] ABSTRACT

An electronic control system for automatic rearview mirrors for automotive vehicles, the control system being effective to detect and compare the relative brightness of light forwardly and rearwardly of the vehicle and respond automatically to annoying glare from the rear of the vehicle and move a reflective element from a full reflective mode to a partial reflective mode and thereafter automatically return the reflective element to a full reflective mode after the source of the annoying glare is removed, the glare threshhold being determined as a function of the ambient light level, of a long, smoothed time average of the ambient light level, of a short smoothed time average of the glare producing light level, and of the recent activity of the mirror.

18 Claims, 2 Drawing Figures

ELECTRONIC CONTROL SYSTEM FOR AUTOMATIC REARVIEW MIRRORS FOR AUTOMOTIVE VEHICLES

BRIEF SUMMARY OF THE INVENTION

This invention relates to rearview mirrors for automotive vehicles and, more particularly, to an improved electronic control system for automatic rearview mirrors for automotive vehicles.

Heretofore, automatic rearview mirrors for automotive vehicles have been devised which automatically transfer from the full reflectance mode (day) to the partial reflectance mode (night) for glare protection from light emanating from the headlights of vehicles approaching from the rear. Such automatic rearview mirrors have become increasingly sophisticated over the years, and the automatic rearview mirror for automotive vehicles disclosed in the applicants' copending application, Ser. No. 06/268,660, filed June 1, 1981 now U.S. Pat. No. 4,443,057 for Automatic Rearview Mirror for Automotive Vehicles, and assigned to the assignee of the present invention, is typical of such sophisticated automatic rearview mirrors. The present invention provides an improved electronic control system for the automatic rearview mirror disclosed in said copending application Ser. No. 06/268,660 filed June 1, 1981, although it will be understood that the present invention is applicable to other uses.

In general, the automatic rearview mirror disclosed in said copending application utilizes a prism type reflective element which is substantially identical to the prism type reflective elements utilized in manually (hand) operated day-night mirrors conventionally provided on modern day automobiles. The automatic rearview mirror disclosed in said copending application automatically responds to annoying glare from the rear of the vehicle and automatically shifts to the partial or low reflectance mode. After the source of the annoying glare is removed, the automatic rearview mirror returns to the full or high reflectance mode without requiring any action on the part of the driver of the vehicle during any portion of the cycle, the power required being drawn either from the vehicle's electrical system or from a self-contained battery.

In the past, many automatic mirrors have been devised for the purpose of automatically shifting the reflective element incorporated therein between the full reflectance and partial reflectance modes. However, proper control of an automatic rearview mirror is a complex task, and there has been a progression in the prior art. With respect to the means for sensing glare conditions, in early attempts to make automatic rearview mirrors, a single rear facing sensor was utilized. Such sensor sensed the glare producing light level impinging on the mirror from the rear, and such mirrors locked in the nonglare position during the day and required constant readjustment to prevent latchup or undesirably high sensitivity as the drive encountered brighter lights in city or town driving. As a first improvement, a second sensor was added to sense the ambient light level and to hold the mirror in a normal position during the day. In most of the control circuits for these two sensor mirrors, the sensitivity of the mirror was reduced as ambient light levels approached daylight levels until the ambient light reached a level above which the mirror remained in the nonglare position. This feature was refined so that the sensitivity of the mirror was referenced to the instantaneous ambient light level during nighttime driving. However, both ambient and glare producing light levels are quite erratic since headlight beams which are momentarily blocked or which suddenly sweep into position cause erratic glare. Moreover, streetlamps, lighted roadside signs, and headlights of oncoming vehicles are erratic sources of ambient light. Thus, mirror operation of such prior art mirrors remained erratic in the face of these conditions. Moreover, the problem was compounded by making the glare threshhold dependant on the erratic instantaneous light level. In an effort to overcome such problems, attempts were made to introduce time delays and to filter the combined ambient and glare producing light levels. However, none of these minor improvements to the prior art mirrors resulted in an commercially successful product since the added nuisance effects of the second sensor more than offset its advantages with the result that the two-sensor circuits were often less desirable than the single sensor circuits.

The first commercially successful automatic rearview mirror for automotive vehicles is disclosed in the applicant's aforementioned copending application Ser. No. 06/268,660. The automatic mirror disclosed in said copending application constituted a major advance in the utilization of ambient light level and the electrical control circuitry for such mirror included forward sensor filtering means characterized by having a long time response and having a smoothing time averaged effect on the forward electrical signal generated by the forward facing sensor means and indicative of the forward light level. The long, smoothed time average of the ambient light level, rather than the ambient light level itself, was then compared with the glare producing light level to determine the glare threshhold of the mirror. Use of the long, smoothed time average of the ambient light level, instead of the instantaneous ambient light level, reduced and all but eliminated the effect of the erratic fluctuation of the ambient light level. A second important benefit of this long, smoothed time average is that it responds to ambient light level in much the same way as the human eye responds. In the automatic rearview mirror disclosed in said copending application, a shorter time average, which does not prevent rapid response of the mirror to strong glare, is optionally applied to the glare producing light level. This shorter time average may be applied independently to the glare producing light level or it may be applied to some combination of the long, smoothed time average of the ambient light level and the glare producing light level, the reason for this option being that the effect of another short time average on the long, smoothed average of the ambient light is minimal. The short time average applied so as to include the glare producing light level is not nearly as beneficial to mirror performance as the long, smoothed time average which is applied to the ambient light level. It is therefore an optional feature of the circuitry disclosed in said prior copending application. The main benefit of the short time average of the signal which includes the glare producing light level is that it prevents some nuisance actuations of the mirror from outside lights and the like. The commercial product which utilizes the long, smoothed average of the ambient light level also has a day detect circuit which inhibits traverse of the mirror to the nonglare position whenever the instantaneous light level exceeds a predetermined value. However, operation of this feature is independent of the glare producing light level.

As previously mentioned, the use of the long, smoothed time average of the ambient light level resulted in a commercially successful product, the mechanical structure and electronic circuitry of such commercial product being disclosed in said copending application. As previously mentioned, the present invention constitutes an improvement on such circuitry.

Automatic rearview mirrors with the long, smoothed time average of the ambient light level adapt well to varied driving conditions and have very desirable performance in most highway and small town driving situations. In light traffic situations, it is desirable for the mirror to traverse to the nonglare position even when glare only causes mild discomfort. First, glare is most annoying and disabling when ambient light levels are low and when brighter lights from other vehicles are frequently encountered. Second, in light traffic, it is not normally necessary for the driver to see as much detail in the mirror as in heavy traffic. The view provided by the mirror in either the normal position or in the nonglare position is usually satisfactory. Consequently, the mirror preferably should be in the more comfortable nonglare position whenever there is glare. Accordingly, such a mirror performs very well in nearly all light traffic conditions. However, in spite of the generally excellent performance of the mirror just described, it may become too active or too sensitive in some situations, particularly in heavy traffic situations. In heavy traffic situations there are a number of reasons for reducing the sensitivity of the mirror below the level normally programmed for the prevailing time averaged ambient light level. First, the ambient light level is not highly correlated with traffic density. Bright streetlights are the source of the highest ambient light level which is normally encountered in night driving. A lightly traveled, but brightly lighted street has a high ambient light level. A heavily traveled but dimly lighted street has a moderate ambient light level. Second, the added visibility, particularly the greatly added depth perception, which normally accompanies the brighter image is needed by the driver. Third, the driver is exposed to enough brighter lights from headlamps and perhaps from streetlamps that glare is not so annoying or disabling. Fourth, more than one set of headlights are often visible in the mirror at the same time. The driver tends to be bothered by the brightest lights while the mirror sensor measures the combined light level of light striking the mirror from angles that are generally in the driver's field of view. The effect is to increase the apparent sensitivity of the mirror when several sets of headlights contribute to the glare. Fifth, heavy traffic, and a few other conditions such as winding or hilly roads, are usually accompanied by very erratic sources of glare. Automobiles change lanes and make turns, and since only strong glare is normally a problem, an automobile may only momentarily be close enough for the glare to be a problem. The result is that the mirror is often undesirably active in heavy traffic conditions.

An object of the present invention is to overcome disadvantages in prior automatic rearview mirrors of the indicated character and to improve the performance of automatic rearview mirrors so that in the great majority of driving situations, including heavy traffic situations, the sensitivity is maintained at an adequately low level and the mirror is not allowed to become too active.

Another object of the present invention is to provide an improved control system for automatic rearview mirrors incorporating improved means for reducing the sensitivity of the mirror when a driver encounters a situation which requires better visibility or reduced activity of the mirror.

Another object of the present invention is to provide an improved control system for automatic rearview mirrors incorporating improved means for monitoring fluctuations in, and the values of, the measured light levels.

Another object of the present invention is to provide an improved control system for automatic rearview mirrors incorporating improved means for monitoring fluctuations in, and the values, of measured light levels so as to approximately indicate conditions where traffic is heavy or where the mirror would normally be overly active, and to reduce the sensitivity of the mirror to a value which is lower than the sensitivity would normally be when the above stated conditions are not indicated.

Another object of the present invention is to provide an improved control system for automatic rearview mirrors wherein the glare threshhold is determined as a function of the ambient light level, of a long, smoothed time average of the ambient light level, of a short, smoothed time average of the glare producing light level, and of the recent activity of the mirror.

The above as well as other objects and advantages of the present invention will become apparent from the following description, the appended claims and the accompanying drawings.

DETAILED DESCRIPTION

Figure 1:
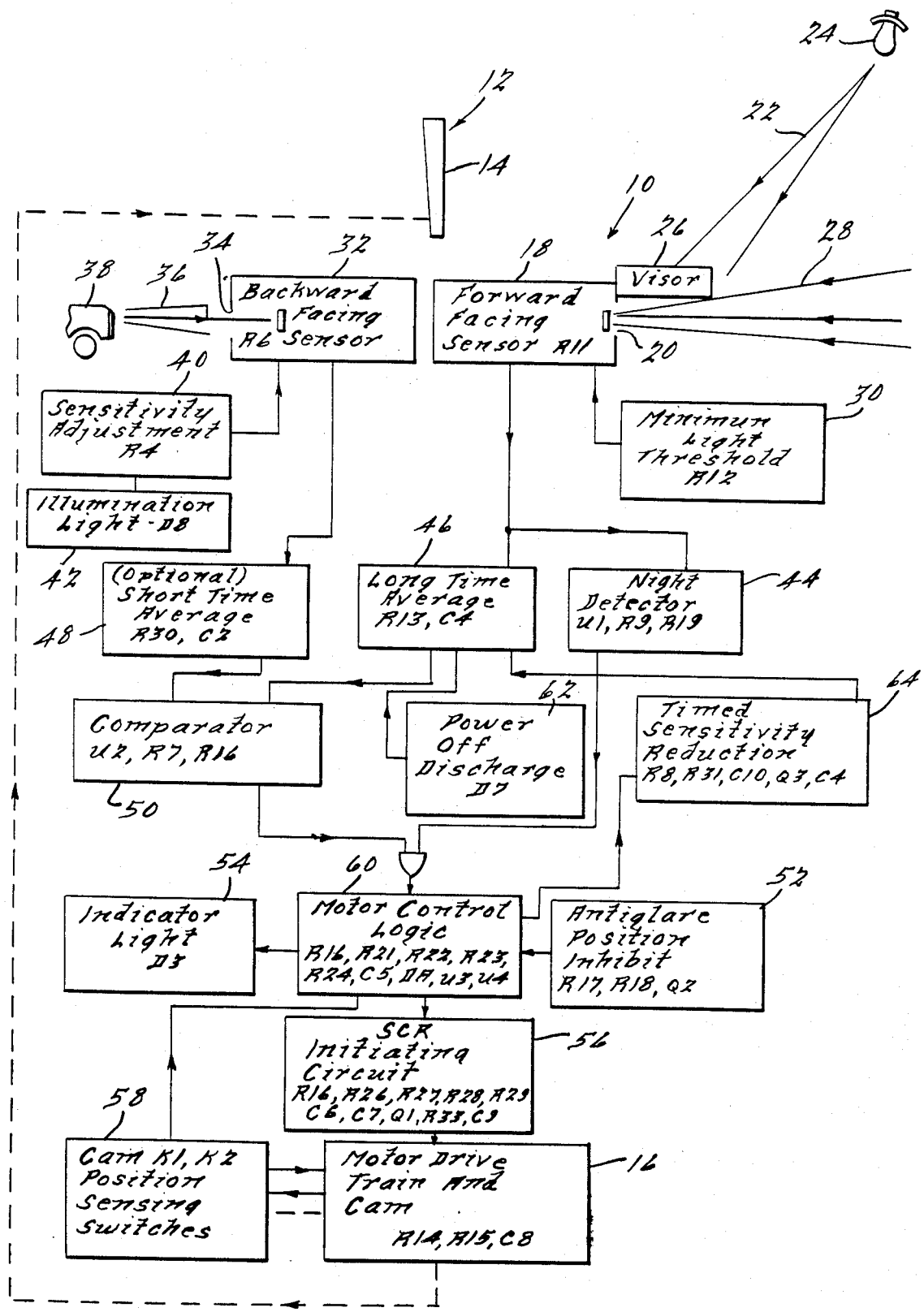
FIG. 1 is a schematic block diagram of an electronic control system for automatic rearview mirrors embodying the present invention.

In the electronic control system for automatic rearview mirrors embodying the present invention, the glare threshold is determined as a function of the ambient light level, of a long, smoothed time average of the ambient light level, of a shorter, smoothed time average of the glare producing light level, and of the recent activity of the mirror. Since the time averages and the measure of the activity of the mirror are time related functions, the functioned relationship may also be defined in terms of the ambient light level, of the glare producing light level, and of time. In general, a first circuit means is provided that detects a stimulus which generally indicates the need for a reduction in the sensitivity of the mirror circuit. In response to the detected stimulus, the first circuit means registers an indication in a memory. A second circuit means is also provided that responde to the altered state of the memory element by effecting a sensitivity reduction for the mirror. The stated memory indication and the resulting reduction in sensitivity are abated during a time period following the detection of the stated stimulus.

Referring to the drawings, a preferred embodiment of the present invention is schematically illustrated therein and is comprised of an electronic control system, generally designated 10, particularly adapted for use in controlling an automatic rearview mirror for automotive vehicles, generally designated 12, only portions of which are illustrated so as to show the connection of the present invention therewith. The automatic rearview mirror 12 is of the type disclosed and described in detial in the applicants' copending application, Ser. No. 06/268,660 filed June 1, 1981 for Automatic Rearview Mirror for Automotive Vehicles, and assigned to the assignee of the present invention. As disclosed in the aforementioned copending application, the automatic mirror 12 is adapted to be mounted on the inside of the windshield of an automotive vehicle and incorporates conventional ball and socket means (not shown) permitting angular adjustment of the mirror in a conventional manner. The automatic rearview mirror 12 includes a conventional prism type reflective element 14 which may be moved from a full reflective mode to a partial reflective mode and thereafter returned to the full reflective mode through the agency of a unidirectional DC motor M, a drive train and cam means all of which are collectively designated 16 and disclosed in detail in the aforementioned copending application. Also as described in detail in the aforementioned copending application, the automatic rearview mirror 12 includes limit switches K1 and K2 which function to start and stop the DC motor M as will be described hereinafter in greater detail, the contacts of the limit switch K1 being closed in the partial reflectance position of the reflective element 14 and open in all other positions of the reflective element while the contacts of the limit switch K2 are open in both the full reflective position and the partial reflective position of the reflective element 14 and closed when the reflective element is intermediate such positions.

FIG. 1 illustrates in schematic block diagram form, the motor M, drive train and the eccentric cam effective to drive the reflective element 14 to the full reflectance and partial reflectance modes, and the cam position sensing switches K1 and K2. A forward facing sensor 18 is provided in the form of a photoelectric cell R11 which is positioned to have a wide angle view through a diverging passageway 20 defined by a subhousing of the automatic mirror, the forward facing sensor 18 being shielded from light rays 22 emanating from overhead streetlights 24 by the housing which acts as a visor 26. The light rays 28 are representative of the ambient light level to which the driver is exposed. The forward facing sensor is thus effective to detect light forwardly of the vehicle and generates a corresponding electrical signal indicative of the forward light level. A minimum light threshhold 30 is provided in the form of a resistor R12 and prevents significant response of the circuit to very low forward light levels. A backward facing sensor 32 is provided in the form of a photoelectric cell R6 which is also mounted in the mirror housing. The backward facing sensor is also protected by the subhousing so as to restrict ambient light from reaching the photoelectric cell R6 except through the aperture 34 provided in the subhousing but to allow light rays 36 emanating from the headlights of a following vehicle 38 to be sensed through the aperture 34. The backward facing sensor is thus effective to detect light rearwardly of the vehicle and generates a corresponding rearward electrical signal indicative of the rearward light level, the rearward signal being independent of the forward signal. A sensitivity adjustment 40 in the form of a potentiometer R4 is provided which controls the sensitivity of the photoelectric cell R6 while an illumination light 42 in the form of a light emitting diode D8 is positioned to illuminate a dial provided for adjusting the resistance of the sensitivity adjustment potentiometer R4. The light emitting diode D8 is lighted whenever the system 10 is energized which is normally whenever the vehicle ignition is turned on. A night detector 44 is provided comprising a comparator U1 and resistors R9 and R19 and holds the reflective element 14 in its high reflective state when the light reaching the forward sensor 18 exceeds a predetermined level but allows the automatic mirror to operate at night. In the embodiment of the invention illustrated, the forward sensor circuitry includes a long time averaging circuit 46 comprising a resistor R13 and a capacitor C4 and responds to the signal from the forward sensor 18 in a way which approximates the time response of the human eye to changing light levels and also smooths what is normally a very active signal from the forward facing sensor 18.

In the embodiment of the invention illustrated, the rearward sensor circuitry includes an optional short time averging circuit 48 comprising a resistor R30 and a capacitor C2, the short time averaging circuit 48 being much faster in response than the long time averaging circuit 46 so as to filter the signal from the backward facing sensor 32 and provide a filtered rearward electrical signal independent of the filtered forward electrical signal. A comparator circuit 50 is provided comprising a comparator U2 and resistors R7 and R16 and is triggered when the rearward light level is high in relation to the time averaging of the forward light level. When the comparator 50 is triggered, the reflective element 14 will move to the antiglare position only if the night detector 44 indicates a night condition and the signal from an antiglare position inhibitor 52 does not inhibit motion to the antiglare position as will be described hereinafter in greater detail. The antiglare position inhibitor is comprised of a transistor Q2 and resistors R17 and R18, and is provided to prevent the reflective element from moving to the low reflective state at undesirable times such as when the vehicle is in reverse gear.

An indicator light 54 is provided in the form of a light emitting diode D3 which alerts the driver of the vehicle that the reflective element 14 is in the antiglare position, this feature being provided so that the driver of the vehicle will not confuse the subdued image of a closely following vehicle with a distant image when the reflective element is in the partial reflectance position.

The unidirectionally driven DC motor M, drive train and eccentric mirror positioning cam are described in detail in the aforementioned copending application and are schematically depicted by the block 16 in FIG. 1. Motor rotation is initiated by a momentary turn-on of the silicon controlled rectifier initiating circuit 56 whenever a change in reflective state is required. The cam positioning switches K1 and K2 schematically depicted in the box 58 in FIG. 1 commutate the silicon controlled rectifier, cause the motor M to run until a proper cam position is reached, and indicate the reflective position of the reflective element 14 to the control logic. The control logic 60 combines the inputs from the comparator 50 and the night detector 44, inhibitor 52 and the cam position indication switches K1 and K2 to determine when to send a trigger pulse to the SCR initiating circuit 56. In the embodiment of the invention illustrated, a logic condition requiring that the reflective element 14 transfer to the partial reflectance mode must be present for about ⅓ second before a trigger pulse is generated. An input logic condition requiring that the reflective element 14 traverse to the full reflectance mode must be present for about 9 seconds before the trigger pulse is generated. In the embodiment of the invention illustrated, a power off discharge 62 is also provided to prevent the reflective element from traversing to the partial reflectance mode if the vehicle's ignition is turned off for a relatively short time.

In accordance with the present invention, a mirror stabilizing circuit 64 is provided which is comprised of a transistor Q3, capacitors C4 and C10, and resistors R8 and R31. The mirror stabilizing circuit 64 reduces the sensitivity of the mirror by about 3 to 1 each time that the mirror changes from the nonglare mode back to the normal mode. Following the reduction in sensitivity, the mirror circuit slowly recovers its normal sensitivity, the recovery having a time constant of about 25 seconds. The reduction in sensitivity, due to a rapid sequence of actuations, is cumulative. In the preferred embodiment of the invention illustrated, the capacitor C4 performs a double function and is the memory element for the long time average on the forward facing sensor 18 and for the sensitivity reduction. As will be described hereinafter in greater detail, the shared use of the capacitor C4 simplifies implementation of the stabilizing feature.

Figure 2:
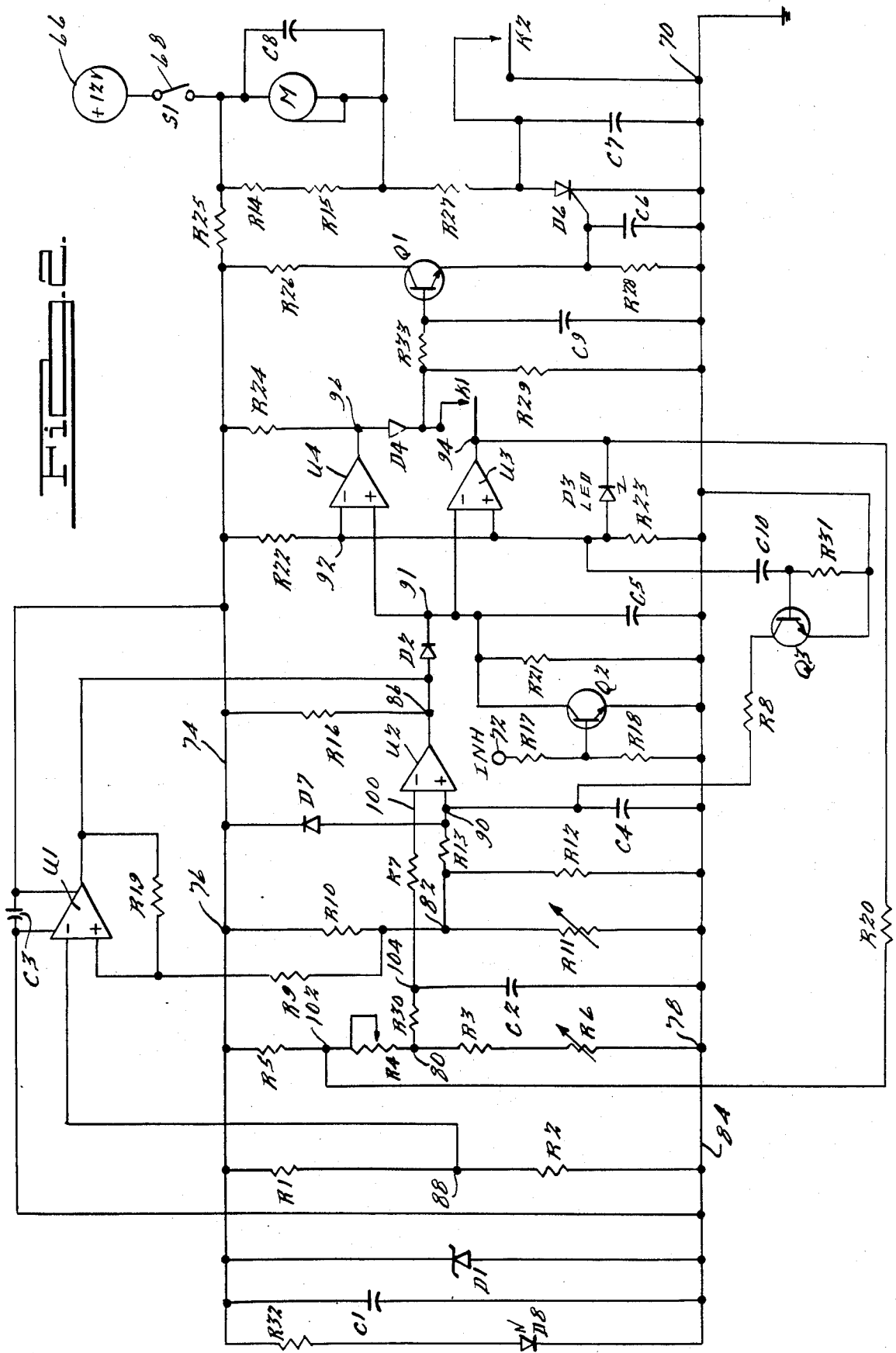
FIG. 2 is a schematic electrical diagram of the electronic control system for automatic rearview mirrors embodying the present invention.

Referring to FIG. 2, circuitry embodying the present invention is illustrated therein, the circuitry being energized by a positive voltage at the terminal 66, which voltage may be supplied by the vehicle electrical system or by a self-contained battery through an on-off switch 68. The terminal 70 is connected to the electrical system ground. The terminal 72 is energized by positive voltage which may be supplied by the circuitry which causes the backup lights of the vehicle to be energized when the vehicle is in reverse gear. Positive voltage supplied to the terminal 72 locks the reflective element 14 out of the partial reflectance mode when the vehicle is in reverse gear to insure that the reflective element is always in the full reflectance position during backing up procedures. The circuitry also includes the unidirectional DC motor M (depicted in the block 16 of FIG. 1), the switches K1 and K2, the light emitting diodes D3 and D8, a zener diode D1, diodes D2, D4, and D7, a silicon controlled rectifier D6, comparators U1, U2, U3, U4, transistors Q1, Q2 and Q3, capacitors C1 through C10, photoelectric cells R6 and R11, the potentiometer R4, and resistors R1 through R3, R5, R7 through R10, and R12 through R33, such components all being electrically connected by suitable conductors as illustrated in the drawings and as will be described hereinafter in greater detail.

The resistor R25 limits current from overvoltage and from a wrong polarity applied to the terminal 66. The zener diode D1 clamps overvoltage levels, both positive and negative, to levels which will not harm the circuit components while the capacitors C1 and C3 filter the supply voltage on the circuit supply bus 74.

The forward light sensor R11 and the backward light sensor R6 are photoresistive having lower resistance at higher incident light levels. The photoelectric cells R6 and R11 are preferably matched so that calibration will not vary significantly from one circuit to the next and so that temperature effects will be largely cancelled. The resistor R10 and the series resistors R4 and R5 are included with the sensors R6 and R11 to form a wheatstone bridge which is energized from the nodes 76 and 78, the potentiometers R4 being the sensitivity adjustment. With a higher resistance setting of the potentiometer R4, the circuitry responds to a higher resistance (lower light level) on the backward facing sensor R6 thereby increasing the sensitivity of the circuit.

Since the sensors R6 and R11 independently receive energy from the supply line 74, the voltage at the node 80, which decreases with increasing light from the rear, and the voltage at the node 82, which decreases with increasing light from the front, are essentially independent. The quad comparator comprising the comparators U1, U2, U3 and U4 is supplied from the bus 74 and has open collector outputs which conduct to the bus 84 in the zero or low output state and which are open or nonconducting in the one or high state.

The node 86 is held low by the comparator U1 or the comparator U2 to keep the reflective element 14 in the fully reflective mode. With the inhibit terminal 72 not energized and with the comparators U1 and U3 high, the capacitor C5 charges through the resistor R16 and the diode D2 causing the output of the comparator U3 to go low and the output of the comparator U4 to go high. This causes the reflective element 14 to traverse to the partial reflectance mode.

As described in detail in the aforementioned copending application, the unidirectional DC motor M rotates an eccentric cam through a three stage reduction to move the reflective element 14 between its reflective positions. The contacts of the switch K1 are open when the reflective element 14 is in its fully reflective mode and closed when the reflective element 14 is in the partially reflective mode. The contacts of the switch K2 are closed except when the reflective element 14 is in each of its two stable positions. The silicon controlled rectifier D6 receives gate current from the transistor Q1 to initiate movement from one reflective state to the other. The gate signal is controlled by the position of the contacts of the switch K1 and the state of the comparators U3 and U4. The gate signal is removed during traverse of the mirror to the required position. The contacts of the switch K2 short the silicon controlled rectifier D6 causing the silicon controlled rectifier D6 to revert to its blocking state as soon as the gate signal is removed. The contacts of the switch K2 open and deenergize the unidirectional DC motor when the reflective element 14 is positioned in its desired reflective state.

The comparator U1 compares the nonfiltered signal at the node 82 against the reference level established at the node 88. The comparator U1 turns on to hold the reflective element 14 in the fully reflective mode when the forward light level is roughly three foot candles or higher. The resistor R19 provides positive feedback which in combination with the resistor R9 makes the comparator U1 bistable. The resistor R9 is much higher in resistance than the photoelectric cell R11 at the threshold point of the comparator U1 and thus serves to approximately match the input impedances at the inputs of the comparator U1.

At forward light levels above 0.1 foot candle, the forward sensed and the time average of the rear sensed light level are compared in almost strict ratiometric fashion. The resistor R12 is in parallel with the forward sensor, and as the forward light level falls below 0.1 foot candle, the conductivity of the resistor R12 becomes increasingly significant in relation to the decreasing conductivity of the forward facing cell R11. The effect is that at forward light levels ranging from 0.1 foot candle to 0.02 foot candles, the voltage at the node 82 does not increase so rapidly with decreasing light level and remains nearly constant for forward light levels below 0.002 foot candles. This establishes a maximum voltage reference level and a corresponding minimum rearward sensed light level to which the comparator will respond. In practical terms, some low light level in the range of 0.001 to 0.02 foot candles does not bother the normal human eye even with very low levels of forward illumination.

For decreasing forward light levels, the circuitry makes a transition from the ratiometric mode in which the light level sent from the rear is compared against the time average of the forward sensed light level to an absolute mode. In the absolute mode active for very low forward light levels. The rearward sensed light level is compared against a minimum threshhold. This minimum threshhold is still affected by sensitivity adjustment of the potentiometer R4.

The resistor R13 and the capacitor C4 form an approximate 22 second RC time constant which averages the "instantaneous" forward light level indicated by the voltage at the node 82 to form a new average reference level at the node 90, and the rearward light level is compared against the reference level at the node 90. The averaging time constant may be slightly longer than 22 seconds because of the source impedance of the forward sensing circuit.

Bright light impinging on the backward facing sensor R6 decreases the resistance of R6 reducing the voltage at the nodes 80, 104 and 100 until the voltage at node 100 falls below the voltage at the node 90. The comparator U2 then turns off and provided that the daylight comparator U1 is off and that the inhibit terminal 72 is not energized, the capacitor C5 charges through the resistor R16 and the diode D2, the charging time constant being about ⅛ second. When the voltage at the node 91 exceeds the voltage at the node 92 established by the voltage divider R22-R23, the output 94 of the comparator U3 is turned on and the output 96 of the comparator U4 is turned off. The light emitting diode D3 is then turned on by current drawn through the resistor R22. The voltage at the node 94 is almost zero and the forward voltage drop across the light emitting diode D3 is about 2 volts. Thus the voltage at the node 90 is 1½ to 2½ volts. The diode D2 blocks reverse current from the node 91 to the node 86 when the comparators U1 and U2 are turned on. The capacitor C5 must discharge through the resistor R21 until the voltage at the node 91 falls to the 1½ to 2½ volt level matching the voltage at the node 92. This requires about 9 seconds and the mirror reverts to the fully reflective mode at this time. The circuit acts as a retriggerable one shot which requires 1/5 to ½ second to trigger (which may be adjusted by changing the values of the resistor R16 and/or the capacitor C5) and will hold the reflective element 14 in the flip position for about 9 seconds (adjustable by changing the values of the resistor R21 or the capacitor C5) after light on the backward facing sensor R6 has fallen below the reference level. The above prevents unreasonably fast cycling of the reflective element 14 since the total cycle from fully reflective to partially reflective and back requires about 9 seconds. When the terminal 72 is energized, current flows through the resistor R17 turning on the transistor Q2 and discharging the capacitor C5 to hold the mirror in or rapidly return it to the fully reflective position. The resistor R18 prevents leaking current from turning on the transistor Q2.

The mirror stabilizing circuit which includes the transistor Q3, the capacitors C4 and C10 and the resistors R8 and R31 reduces the sensitivity of the mirror. The capacitor C4 takes a long, smoothed time average of the ambient light level and also reduces the sensitivity of the mirror after each return to the normal position as described hereinafter in greater detail. The voltage on the capacitor C4 decreases with increasing ambient light level and with increasing activity of the mirror. In order to determine a glare condition, the comparator U2 compares the signal from the backward facing sensor at the input 100 against the voltage on the capacitor C4 at the input 90. By decreasing the charge on the capacitor C4 and thus the voltage at the input 90, the glare signal must increase in order to reduce the voltage at the input 100 below the lowered voltage at the input 90 to cause the comparator U2 to turn on. Turn on of the comparator U2 results in the mirror going to the nonglare position as described hereinabove. The transistor Q3, the capacitor C10 and the resistors R8 and R31 function to reduce the charge on the capacitor C4 during each return of the mirror to its normal position. The effect is to reduce the sensitivity of the mirror, and the normal sensitivity of the mirror is regained as the capacitor C4 recharges through the resistor R13 with a time constant of about 25 seconds.

The sequence of the control system 10 is as follows: In the fully reflective position of the reflective element 14, the node 94 is high, the node 96 is low, and the contacts of the switches K1 and K2 are open. A command to go to the partial reflectance position causes the node 96 to go high and the node 94 to go low. Current then flows through the resistor R24 and the diode D4 to the base of the transistor Q1. The transistor Q1 then conducts supplying current from the resistor R26 to the gate of the silicon controlled recifier D6. The silicon controlled rectifier D6 then turns on and energizes the unidirectional DC motor through the resistor R27. The unidirectional DC motor then functions to move the reflective element 14 out of the fully reflective mode. The contacts of the switch K2 then close and later the contacts of the switch K1 close, thereby turning off the transistor Q1. The silicon controlled rectifier D6 turns off because both the anode and gate currents are removed. The contacts of the switch K2 open when the partially reflective position of the reflective element 14 is reached, and the circuit remains stable until a command to return to the fully reflective position is received.

In the partial reflective mode, the contacts of the switch K2 are open, the contacts of the switch K1 are closed, the node 96 is high and the node 94 is low. A command to return to the fully reflective position causes the node 96 to go low and the node 94 to go high. Current then flows through the resistor R22, the light emitting diode D3, the contacts of the switch K1 to the base of the transistor Q1. The transistor Q1 then turns on, turning on the silicon controlled rectifier D6, and the unidirectional DC motor moves the reflective element 14 away from the partial reflectance position causing the contacts of the switch K2 to close and later causing the contacts of the switch K1 to open thereby removing base current from the transistor Q1. The silicon controlled rectifier D6 then has gate and anode current removed and turns off. The contacts of the switch K2 open when the reflective element 14 reaches its fully reflective position.

In initiating a transition of the reflective element 14 to the low reflectance mode, the node 91 goes high causing the comparator U3 to pull the node 94 low. The diode D3 conducts pulling the voltage at the node 92 from about 6 volts to about 2 volts. The capacitor C10 is partially discharged through the resistor R31, and the base of the transistor Q3 goes negative so that the transistor Q3 remains off and no reduction in sensitivity is effected. In initiating a transition of the reflective element 14 to the high reflectance mode, the node 91 goes low causing the comparator U3 to turn off. Current through the diode D3 is reduced causing the voltage at the node 92 to rise. The rising voltage at the node 92 is coupled via the capacitor C10 to the base of the transistor Q3 turning it on for about 10 milliseconds. The capacitor C4 is discharged to approximately ⅓ of its initial voltage through the resistor R8 and the transistor Q3. The capacitor C10 discharges through the resistor R31 and the base of the transistor Q3, allowing the transistor Q3 to turn off. The control discharge of the capacitor C10 results in a reasonably predictable turn-on period for the transistor Q3 and thus a reasonably predictable percentage of discharge for the capacitor C4. The capacitor C4 recharges through the resistor R13 and repeated transitions of the mirror to the normal position before the capacitor C4 recovers its normal charge serve to further reduce the charge on the capacitor C4 thereby further reducing the sensitivity of the mirror.

The capacitor C6 prevents noise from triggering the silicon controlled rectifier D6. The capacitor C7 is a snubbing capacitor for the silicon controlled rectifier D6 while the resistors R14 and R15 suppress inductive transients from the unidirectional DC motor. The resistors R28 and R29 conduct leakage current away from the silicon controlled rectifier D6 and the transistor Q1. The resistor R20 provides positive feedback to cause bistable switching of the comparator U2. The resistors R14 and R15 are preferably formed of high temperature coefficient wire and are preferably spaced apart for heat distribution purposes in the event they are continuously energized. The resistors R14 and R15 which are in parallel with the unidirectional DC motor improve braking action and reduce coast.

The feedback resistor R20 is connected to the node 102 which results in a hysteresis level which is not materially affected by the setting of the potentiometer R4. The resistor R33 and the capacitor C9 filter out strong RF interference from nearby transmitters since such signals could otherwise cause unwanted actuation of the mirror.

It has been found that light levels both forwardly and rearwardly of the vehicle and under practically all driving conditions are quite erratic. The time constant at the node 104 is the product of the capacitor C2 and the sum of the resistance of the resistor R30 and the source resistance of the rear facing sensor circuit at the node 80. The resistance at the node 80 decreases and the resistance of the photoelectric cell R6 decreases due to increased light levels. The resistor R30 maintains a time constant of about 0.033 seconds even in high light level situations. The time constant is considerably longer when the resistance of photoelectric cell R6 is high in low light level situations. This minimizes the tendency of lights along the side of a dimly lighted road to actuate the antiglare circuit.

The voltage across the resistor R3 is significant compared to the voltage across the photoelectric cell R6 only when the resistance of the phtoelectric cell R6 is low, that is when light levels are high. The resistor R3 decreases the sensitivity of the unit in high light levels for all sensitivity settings. The resistor R3 also minimizes nuisance actuation of the circuit at dawn and dusk.

Without the diode D7, the capacitor C4 would tend to retain a charge for an appreciable time after the circuit is deenergized with the ignition turned off. If the ignition is turned back on within a short time, there would be a tendency for the voltage on the capacitor C4 to cause the element 14 to traverse to the antiglare position. However, when the capacitor C4 is discharged, there is the desirable reverse tendency to hold the reflective element 14 out of the antiglare position for several seconds after the ignition is turned on and until the capacitor C4 charges. The diode D7 is reversed biased during power on and has no effect on the circuit. However, during power down, the diode D7 conducts thereby discharging the capacitor C4 so that the reflective element 14 will not traverse to the antiglare position if the ignition is turned off and on in a a relatively short time.

Typical values for the components of the circuitry described hereinabove are as follows:

R1—2.7 M ohm
R2—100 K ohm
R3—15 K ohm
R4—1.5 M ohm - Carbon Potentiometer
R5—39 K ohm
R6—Photocell
R7—390 K ohm
R8—180 ohm
R9—100 K ohm
R10—270 K ohm
R11—Photocell
R12—560 K ohm
R13—470 K ohm
R14—15 ohm - Nickel
R15—15 ohm - Nickel
R16—33 K ohm
R17—27 K ohm
R18—4.7 K ohm
R19—6.8 M ohm
R20—390 K ohm
R21—470 K ohm
R22—4.7 K ohm
R23—10 K ohm
R24—47 K ohm
R25—270 ohm 1 W
R26—3.9 K ohm
R27—3.9 ohm
R28—1 K ohm
R29—47 K ohm
R30—22 K ohm (optional)
R31—10 K ohm
R32—820 ohm
R33—10 K ohm
C1—47 MFD, 10 V
C2—1.5 MFD, 16 V (optional)
C3—0.022 MFD
C4—47 MFD, 10 V
C5—10 MFD, 16 V
C6—22 MFD, 16 V
C7—0.047 MFD
C8—0.0022 MFD
C9—0.01 MFD
D1—Zener Diode 1N4739A
D2—1N4148
D3—Light Emitting Diode
D4—1N4004

D6—C203D, Silicon Controlled Rectifier
D7—1N4148
D8—Light Emitting Diode
U1—¼LM2901, Comparator
U2—¼LM2901, Comparator
U3—¼LM2901, Comparator
U4—¼LM2901, Comparator
Q1—2N3904, Transistor
Q2—2N3904, Transistor
Q3—2N3904, Transistor In the operation of the mirror 12, upon entering the vehicle, the driver should adjust the reflective element 14 for good rearward vision and adjust the potentiometer R4 to the desired setting. Such setting may be adjusted to suit the preferences of the driver. Then, when the headlights of a vehicle approaching from the rear tend to cause annoying glare, the system 10 will signal the reflective element to move to the antiglare position and the following chain of events will take place. The unidirectional DC motor is energized and begins rotating, and through the agency of the drive train and cam, moves the reflective element 14 to the antiglare position. The contacts of the switch K2 open and deenergize the unidirectional DC motor when the reflective element 14 is positioned in the desired antiglare position. The reflective element 14 then remains in the antiglare position until the source of the glare is removed. When the source of the glare is removed, the system 10 will signal the unidirectional DC motor to reinitiate rotation, thereby closing the limit switch K2 and also moving the reflective element 14 through the agency of the drive train and cam to return the reflective element to the fully reflective mode. At this point, the limit switch K2 opens and the cycle is completed. The reflective element 14 will then remain in the full reflectance mode until another source of annoying glare is encountered, whereupon the cycle will be repeated. However, the mirror stabilizing circuit reduces the sensitivity of the mirror by about 3 to 1 each time that the mirror changes from the nonglare condition back to the normal mode. Following the reduction in sensitivity, the system 10 slowly recovers its normal sensitivity, the recovery having a time constant of about 25 seconds. Moreover, the reduction in sensitivity, due to a rapid sequence of actuations, is cumulative.

While a preferred embodiment of the invention has been illustrated and described, it will be understood that various changes and modifications may be made without departing from the spirit of the invention.

What is claimed is:

1. A control system for an automatic rearview mirror for an automotive vehicle, said automatic rearview mirror including a reflective element having a full reflectance mode and a partial reflectance mode, forward facing sensor means effective to detect light forwardly of the vehicle and generate a corresponding forward electrical signal indicative of the forward light level, backward facing sensor means effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, a rearward circuit having an input connected to said backward facing sensor means and an output, means operable to change said reflective element between said full reflectance mode and said partial reflectance mode as a function of the output of said rearward circuit and the filtered forward electrical signal, the functional time response provided by said forward facing sensor filtering means being slower than the functional time response provided by said rearward circuit, and means effective to reduce the sensitivity of the mirror as a function of the recent activity of said reflective element.

2. The combination as set forth in claim 1 including means controlling the sensitivity of said backward facing sensor means.

3. The combination as set forth in claim 1, said rearward circuit including backward sensor filtering means effective to filter the rearward electrical signal generated by said backward facing sensor means and being characterized by having a second time response shorter than the first time response of said forward sensor filtering means and having a smoothing time averaging effect on the rearward electrical signal to produce a filtered rearward electrical signal independent of said filtered forward electrical signal.

4. The combination as set forth in claim 1 including means effective to hold said reflective element in its full reflectance mode when the light detected by said forward facing sensor means exceeds a predetermined value.

5. The combination as set forth in claim 1 including means preventing significant response to the forward electrical signal generated by said forward facing sensor means when the light detected by said forward facing sensor means is below a predetermined value.

6. The combination as set forth in claim 1 wherein said means operable to change said reflective element between said full reflectance mode and said partial reflectance mode includes unidirectional, rotatable DC motor means.

7. The combination as set forth in claim 1 including means indicating the mode of said reflective element.

8. The combination as set forth in claim 1 including light emitting diode means energizable when said reflective element is in its partial reflective mode.

9. The combination as set forth in claim 1 including means to cause said reflective element to traverse to and remain in said full reflectance mode when the vehicle is in reverse gear.

10. The combination as set forth in claim 1 including power switch means, and means preventing said reflective element from changing to its partial reflectance mode when said power switch means is momentarily opened and closed.

11. A control system for an automatic rearview mirror for an automotive vehicle, said rearview mirror including a reflective element having a full reflectance mode and a partial reflectance mode, said control system including first sensor means effective to detect light forwardly of the vehicle and generate a corresponding forward electrical signal indicative of the forward light level, second sensor means effective to detect light rearwardly of the vehicle and generate a corresponding rearward electrical signal indicative of the rearward light level, forward sensor filtering means characterized by having a first time response and having a smoothing time averaging effect on the forward electrical signal and acting on the forward electrical signal to produce a filtered forward electrical signal independent of the rearward electrical signal, a rearward circuit having an input connected to said second sensor means and an output, comparator means comparing the output of said rearward circuit and the filtered forward electrical signal, unidirectional, rotatable DC motor means operable to move said reflective element between said full reflectance mode and said partial reflectance mode, means controlling the energization of said motor means and controlled by said comparator means whereby said reflective element may be moved between its full reflectance mode and its partial reflectance mode as a function of the output of said rearward circuit and the filtered forward electrical signal, the functional time response provided by said forward sensor filtering means being slower than the functional time response provided by said rearward circuit, and means effective to reduce the activity of said reflective element as a function of the recent activity of said reflective element.

12. The combination as set forth in claim 11 including means for manually adjusting the sensitivity of said second sensor means.

13. The combination as set forth in claim 11, said rearward circuit including backward sensor filtering means characterized by having a second time response shorter than the first time response of said first forward sensor filtering means and having a smoothing time averaging effect on the rearward electrical signal to produce a filtered rearward electric signal independent of the filtered forward electrical signal.

14. The combination as set forth in claim 11 including resistance means preventing significant response to said first sensor means when the light detected by said first sensor means is below a predetermined value, and means effective to hold said reflective element in its full reflectance mode when the light detected by said first sensor means exceeds a predetermined value.

15. The combination as set forth in claim 11 including means to cause said reflective element to traverse to and remain in said full reflectance mode when the vehicle is in reverse gear, power switch means, and means preventing said reflective element from changing to its partial reflectance mode when said power switch means is momentarily opened and closed.

16. A control system for an automatic rearview mirror for an automotive vehicle, said rearview mirror including a reflective element having a full reflectance mode and a partial reflectance mode, said control system including first sensor means effective to detect light forwardly of the vehicle and generate a corresponding forward electrical signal indicative of the forward light level, second sensor means effective to detect light rearwardly of the vehicle and generate a corresponding rearward electrical signal indicative of the rearward light level, forward sensor filtering means including a capacitor and characterized by having a first time response and having a smoothing time averaging effect on the forward electrical signal and acting on the forward electrical signal to produce a filtered forward electrical signal independent of the rearward electrical signal, a rearward circuit having an input connected to said second sensor means and an output, comparator means comparing the output of said rearward circuit and the filtered forward electrical signal, unidirectional, rotatable DC motor means operable to move said reflective element between said full reflectance mode and said partial reflectance mode, means controlling the energization of said DC motor means and controlled by said comparator means whereby said reflective element may be moved between its full reflectance mode and its partial reflectance mode as a function of the output of said rearward circuit and the filtered forward electrical signal, the functional time response provided by said forward sensor filtering means being slower than the functional time response provided by said rearward circuit, and means effective to reduce the charge on said capacitor during each return of said reflective element to its fully reflective mode and permitting said capacitor to thereafter recharge at a predetermined rate.

17. The combination as set forth in claim 16, said means controlling the energization of said motor means including a silicon controlled rectifier.

18. The combination as set forth in claim 16, said rearward circuit including backward sensor filtering means characterized by having a second time response shorter than the first time response of said forward sensor filtering means and having a smoothing time averaging effect on the rearward electrical signal to produce a filtered rearward electrical signal independent of said filtered forward electrical signal, means effective to hold said reflective element in its full reflective mode when the light detected by said forward facing sensor means exceeds a predetermined value, means preventing significant response to the forward electrical signal generated by said forward facing sensor means when the light detected by said forward facing sensor means is below a predetermined value, means inhibiting change of said reflective element between said full reflectance mode and said partial reflectance mode when the vehicle is in reverse gear, power switch means, and means preventing said reflective element from changing to its partial reflectance mode when said power switch means is momentarily opened and closed.

* * * * *